Jan. 25, 1949.　　　　J. D. FAUDREE　　　　2,460,078
WORK HOLDER FOR TOOL GRINDERS

Filed Sept. 19, 1946　　　　　　　　　　　5 Sheets-Sheet 1

JOHN D. FAUDREE.
INVENTOR.

BY *Altsch + Knoblock*

ATTORNEYS.

Jan. 25, 1949. J. D. FAUDREE 2,460,078
WORK HOLDER FOR TOOL GRINDERS
Filed Sept. 19, 1946 5 Sheets-Sheet 4

INVENTOR.
JOHN D. FAUDREE.
BY
ATTORNEYS.

Jan. 25, 1949.　　　　J. D. FAUDREE　　　　2,460,078
WORK HOLDER FOR TOOL GRINDERS
Filed Sept. 19, 1946　　　　　　　　　　5 Sheets-Sheet 5
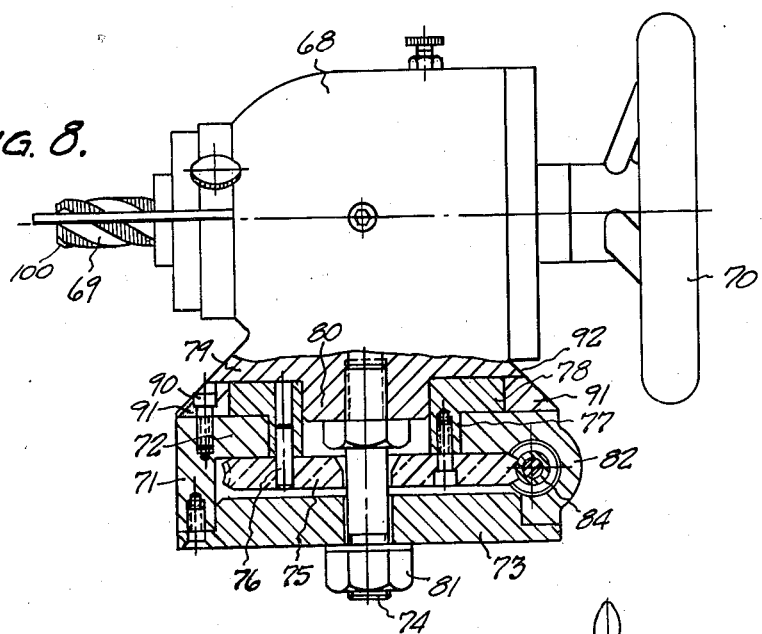
FIG. 8.
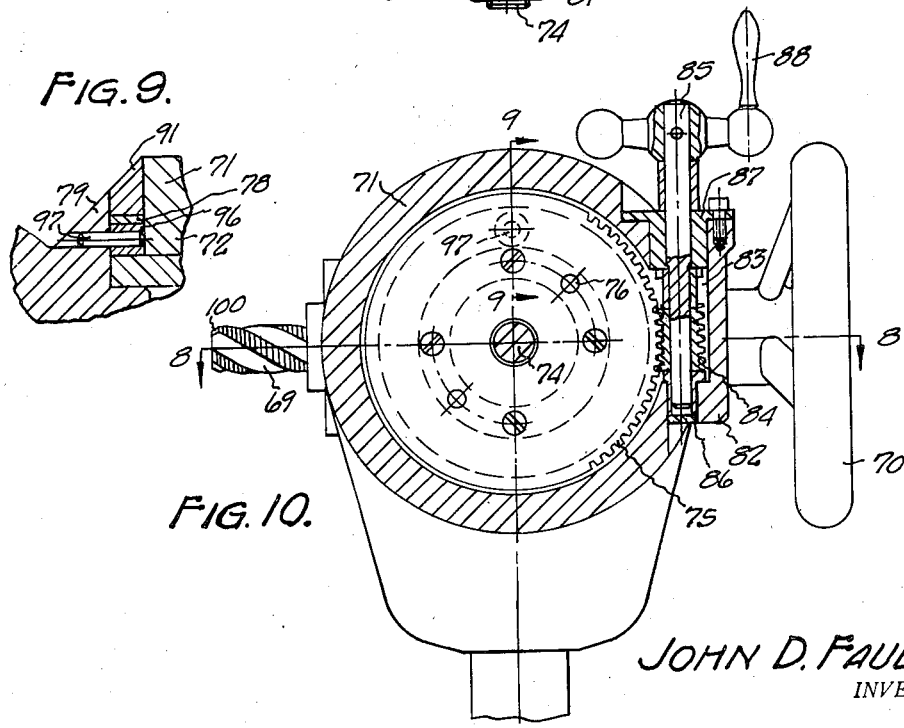
FIG. 9.
FIG. 10.
JOHN D. FAUDREE.
INVENTOR.
BY　Oltsch + Knoblock
ATTORNEYS.

Patented Jan. 25, 1949

2,460,078

UNITED STATES PATENT OFFICE 2,460,078

WORK HOLDER FOR TOOL GRINDERS

John D. Faudree, South Bend, Ind., assignor of one-half to Raymond L. Kuns, New Carlisle, Ind.

Application September 19, 1946, Serial No. 698,015

14 Claims. (Cl. 51—219)

This invention relates to improvements in work holders for tool grinders, and more particularly to a device for holding spiral taps, spiral reamers, drills and similar tools, in relation to a tool grinder.

Various types and constructions of work holders for tool grinders are now available on the market which serve satisfactorily for grinding or dressing various types of tools, such as straight fluted taps and reamers. The use of such grinders makes it possible to sharpen and reclaim tools whose cutting edges have been dulled or chipped. However, all devices of which I have knowledge are equipped with work holders which are limited in their adjustability and unsuited for the purpose of holding spiral taps, spiral reamers and similar tools, in proper position for accurate grinding thereof. A high degree of accuracy is required in the grinding operation to insure uniformity of the grinding or dressing operation, especially in a tool such as a tap or reamer having a chamfered end. This accuracy can be obtained only if the work is positioned properly relative to the grinding wheel. In the case of tools having spiral flutes, the angular position between the tool and the grinding wheel which is required for accurate grinding or dressing is different from that required for grinding straight fluted tools. Proper sharpening of a spirally fluted tool requires that the tool be positioned at a compound angle relative to the grinder, the angle being dependent upon the lead and angle of the spiral. Improper dressing or grinding of a spirally fluted tap or reamer will greatly shorten the life of the tool and produce a departure from the requisite uniformity of the sharpness at the chamfer which will result in spoilage of the work. Conventional devices now available on the market do not provide for positioning of such parts at the required compound angles. Consequently, it is not possible, with equipment on the market today, to properly grind or sharpen tools having spiral flutes.

It is the primary object of this invention to provide a work holder for a tool grinder by which it is possible to accurately and properly position a tool of the spirally fluted chamfered type, such as a spiral tap or spiral reamer, with respect to a grinder to insure and make possible uniform sharpening of the chamfered leading edges of its flutes and thereby avoid spoilage of work on which the sharpened tool is used and insure maximum life of the tool.

A further object is to provide a work holder for a tool grinder which is adjustable about multiple angularly related axes by which it is possible to hold a work piece at any selected compound angle relative to the tool grinder.

A further object is to provide a work holder for a tool grinder which is adjustable angularly about several axes and is adjustable bodily vertically in accurately measured extents and which includes means for locking it in any selected position.

Other objects will be apparent from the following specification.

In the drawing:

Fig. 8 is a top elevation of the work holding chuck of the work holder with parts thereof shown in section taken on line 8—8 of Fig. 10.

Fig. 9 is a fragmentary detail sectional view of the device taken on line 9—9 of Fig. 10.

Fig. 10 is a vertical sectional view of the device taken on line 10—10 of Fig. 7.

Fig. 11 is a transverse sectional view of the device taken on line 11—11 of Fig. 6.

Figure 7:
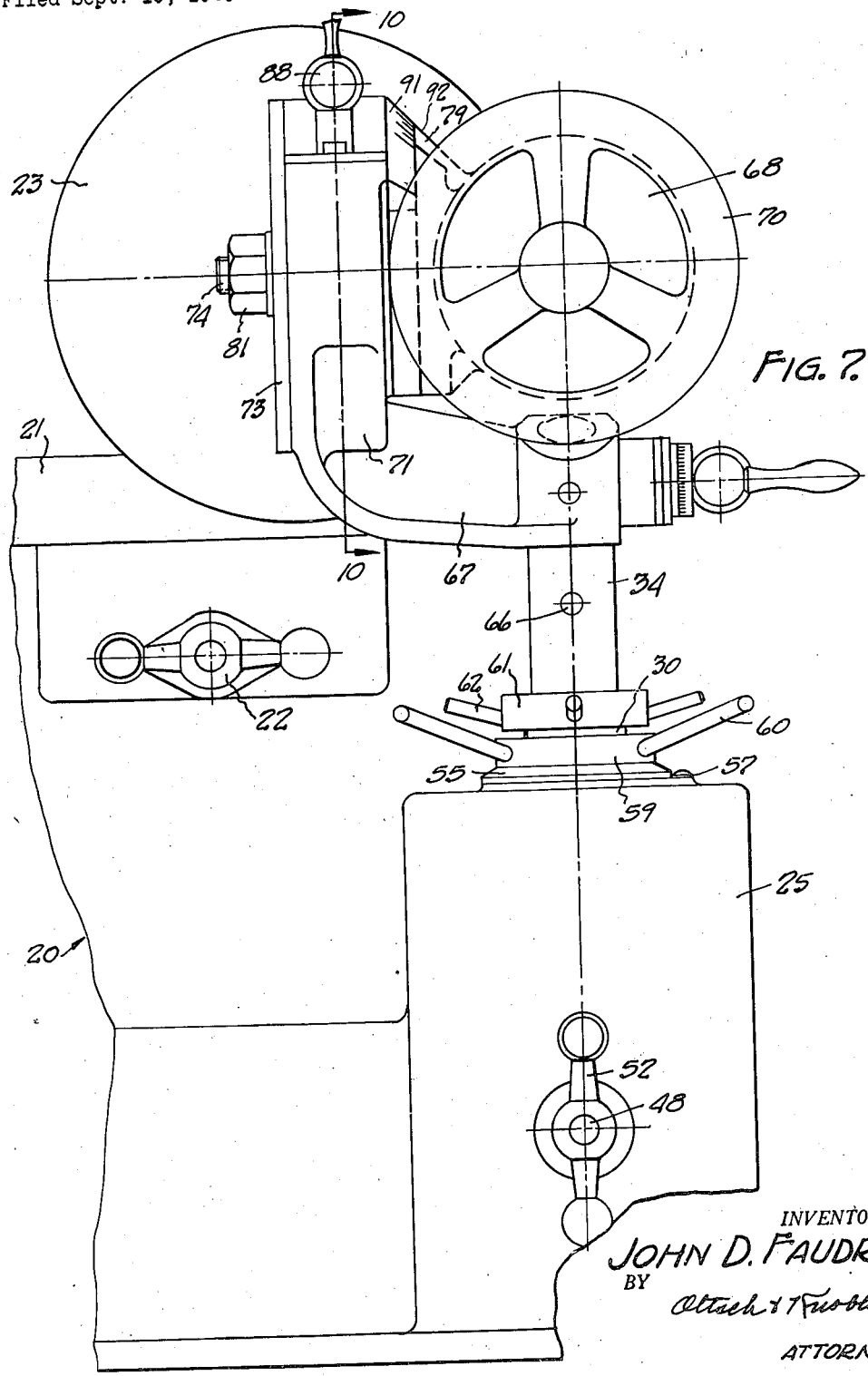
Fig. 7 is an end view of the work holder applied to a tool grinder.

The device may be used with any conventional or standard form of tool grinder which comprises the usual frame 20 mounting a cross-slide 21 operable by actuating mechanism 22 and carrying a housing 23 for a grinding wheel 24 which is driven by a motor or other suitable driving means (not shown). The frame of the grinder may include a standard or portion 25 of the frame positioned at one end thereof forwardly of and below the grinding wheel housing 23 as best illustrated in Fig. 7.

Figure 6:
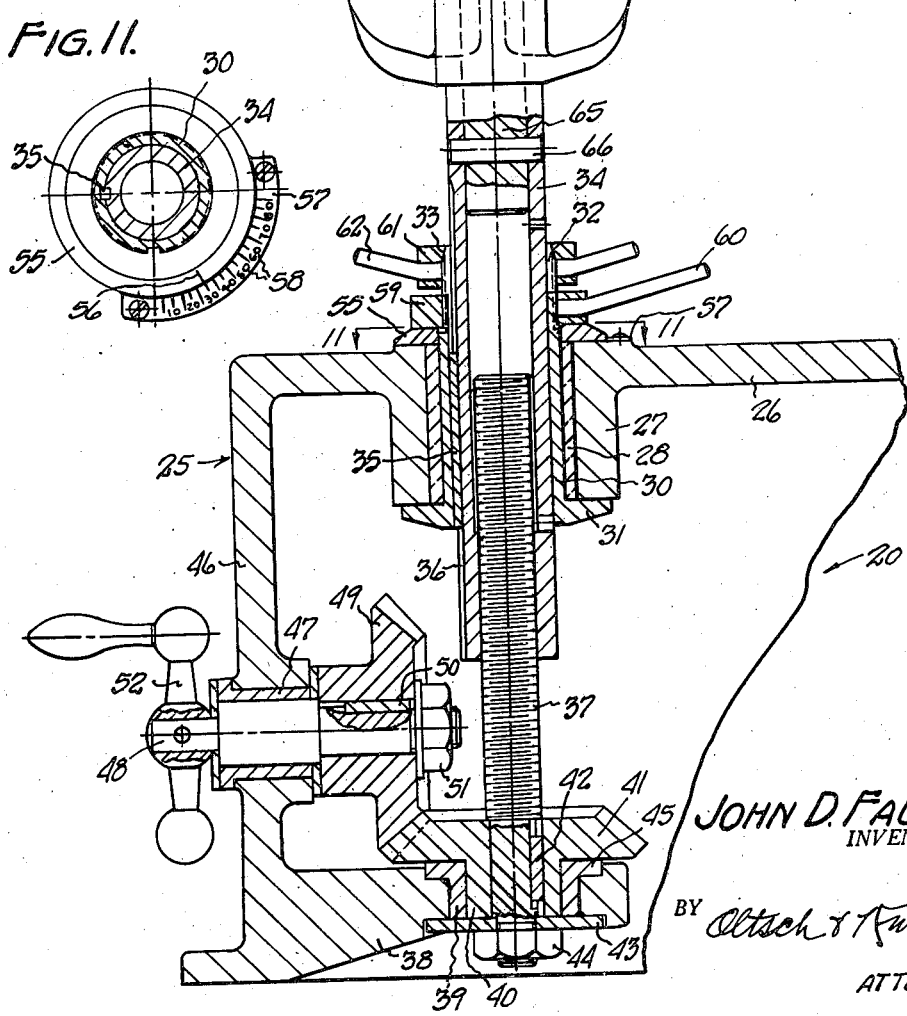
Fig. 6 is a front elevation view of the work holder with parts shown in section.

Referring to Fig. 6, it will be observed that the standard portion 25 of the frame of the grinding tool is generally of rectangular shape and hollow construction. The top wall 26 of the frame extension 25 has an opening therein outlined by a depending projecting cylindrical flange 27 whose inner surface is lined by a bearing 28. The bearing 28 rotatably receives an elongated sleeve 30 having an enlarged flange 31 at its lower end adapted to abut against the lower end of the flange 27. The upper end portion 32 of the sleeve 30 is split longitudinally at a portion thereof projecting above the top of the wall 26 and its end is tapered at 33. A second and longer tubular sleeve member 34 is splined or otherwise anchored to sleeve member 30 as by means of a key 35 carried by the sleeve 30 and slidable in a keyway 36 formed in the sleeve 34. The lower end of the sleeve 34 has a reduced diameter bore which is screw-threaded to receive a vertical screw-threaded shaft 37.

A flange or projection 38 is formed in the lower portion of the housing 25 and has an aperture lined by a bearing 39 in which the stud 40 of a bevel gear 41 is journaled. The stud and worm gear 40, 41 have a central opening in which the lower end of the shaft 37 is splined by a key 42 and the parts are retained against endwise movement by means of a plate 43 bearing against the lower face of the frame part 38 and against which a nut 44 threaded on the lower end of the shaft 37 bears. It will be observed in this connection that the bearing 39 has a flange 45 at its upper end and this flange bears against the upper surface of the frame part 38 and cooperates with the plate 43 and the nut 44 to prevent vertical play of the shaft 37 and the bevel gear 41.

The outer end wall 46 of the frame portion 25 has a horizontal opening therein lined by a bearing 47 in which is journaled a stud shaft 48. A bevel gear 49 is mounted on the inner end of the shaft 48 and is preferably splined thereto by a key 50. The bevel gear 49 is held in place by the nut 51 threaded on the shaft 48. The bevel gear 49 meshes with bevel gear 41. The outer projecting end of the stud shaft 48 mounts a suitable crank or other operating member 52. By this construction it will be observed that when the crank 52 is rotated it serves to rotate gears 49 and 41 and the shaft 37, and the latter by virtue of its screw-threaded connection with the lower end of the sleeve 34 serves to vertically shift the sleeve 34 relative to the frame 25.

The sleeve 30 has fixedly secured to a portion thereof, projecting above the wall 26, a ring member 55, which normally bears flat upon the wall 26 around the sleeve 34 and bears a mark 56 extending radially thereof at its beveled marginal portion and adapted to be read in conjunction with an arcuate indexing member 57 concentric with the sleeve 34 and angularly calibrated by indicia 58 with respect to which the angular position of the member 55 and the sleeve 34 may be read from the mark 56. The sleeve 34 is locked in any selected angular position by means of a collar 59 threaded on the split upper portion 32 of sleeve 30 to which sleeve 34 is keyed at 35. Collar 59 is provided with projecting handle 60, and serves to lock the parts against rotation when it is adjusted into flush gripping engagement with the upper face of the member 55. A collet 61 provided with projecting handles 62 fits upon the upper end of the sleeve 30 and is adapted to bear against the tapered end 33 of the split upper portion 32 of said sleeve 30 to contract the fingers of the sleeve 30 and thereby grip the sleeve 34 in a manner to lock the sleeve 34 in selected vertical position.

The upper end of the sleeve 34 receives a stud 65 which is fixedly anchored to the sleeve by a pin 66 passing through said sleeve and stud. The stud 65 carries a support 67 for a tool chuck 68 which may be of any suitable construction and is adapted to receive therein the work piece 69, such as a drill, a tap, a reamer or other type of chamfered machine tool, which is locked in place therein by operation of the hand wheel 70 in a manner well understood in the art.

The support or mounting of the tool holder 68 includes a vertical housing 71 and is of the construction best illustrated in Figs. 8, 9 and 10. The housing 71 has a flange 72 projecting inwardly at one end thereof, and the opposite end thereof removably mounts a plate 73. A stud shaft 74 projects through an opening in the center of the plate 73 and journals a worm gear 75 within the housing. The worm gear 75 has fixedly secured thereto by means of pins, studs or the like 76, a bearing sleeve 77 fitting within the opening defined by the inner periphery edge of the flange 72 of the housing 71. The bearing 77 has a flange 78 projecting outwardly therefrom and bearing against the outer wall of the flange 72. The housing of the tool chuck includes a base portion 79 whose face bears against the face of the flange 78 of the bearing 77, and a central stud or lug 80 which fits within the bearing 77. The shaft 74 is secured in the stud 80 at its inner end and the parts are held in assembled relation by a nut 81 on the outer end of shaft 74 bearing against the plate 73.

The housing 71 has tangentially projecting portion 82 having a bore 83 receiving a worm 84 adapted to mesh with the worm gear 75. The worm 84 is keyed or otherwise secured upon a shaft 85 journaled in bearings 86 and 87 at the opposite ends of the housing portion 82. An operating crank 88 is mounted upon the outer end of the shaft 85. It will be observed that upon operation of the crank 88 to cause rotation of the shaft 85 and the worm 84, the worm gear 75 is caused to rotate. This simultaneously and equally rotates the bearing 77, 78 to which the worm gear 75 is anchored by the pins 76, and the rotation of the member 77, 78 is transmitted to the work holding chuck 68 by virtue of the pins 97 hereinafter described. By this means the work holder 68 is caused to rotate about the axis of the shaft 74 relative to the housing 71. The housing 71 has fixedly secured thereto as by means of screws 90 a beveled ring 91 interposed between the flange 72 of the housing and the base portion 79 of the work holder. The ring 91 has an outer peripheral beveled surface complementary to and forming a continuation of the outer beveled surface 92 of the frame portion 79 of the work holder 68, and one of these surfaces may be calibrated to designate angular disposition of the chuck with respect to the frame 71 when read in conjunction with a mark or indicia upon the cooperating or complementary beveled surface as is well understood in the art.

Referring to Fig. 9 it will be observed that a bushing 96 is pressed into an opening in the flange 78 of sleeve 77. The bushing 96 receives a locating pin 97 carried by the frame 79 of the work chuck 68. This pin serves to transmit the rotation of sleeve 77 to the chuck 68 as above mentioned. It also serves to insure accurate indexing of the parts when one chuck 68 replaces another, whereby the angular setting of the parts may always be read from the indicia on parts 91 and 92.

It will be observed that the bracket or carrier 67 for the gear housing portion 71, with respect to which the tool carrier or chuck 68 rotates, extends laterally from the tube 34 so that the housing 71 is laterally offset relative to the axis of the tube 34. The lateral offset in this case is of such dimensions with relation to the size of the chuck 68 and associated parts that the axis of the chuck and of the tool 69 carried thereby intersects the axis of the shaft 34 as best illustrated in Fig. 7. This makes possible a close correlation of all of the operating parts of the device and facilitates and simplifies the setting or adjustment of the parts for a given tool as well as adjustment of the cross slide mechanism of the grinder to bring the grinding wheel 24 into proper engagement with the work.

Figures 1, 2:
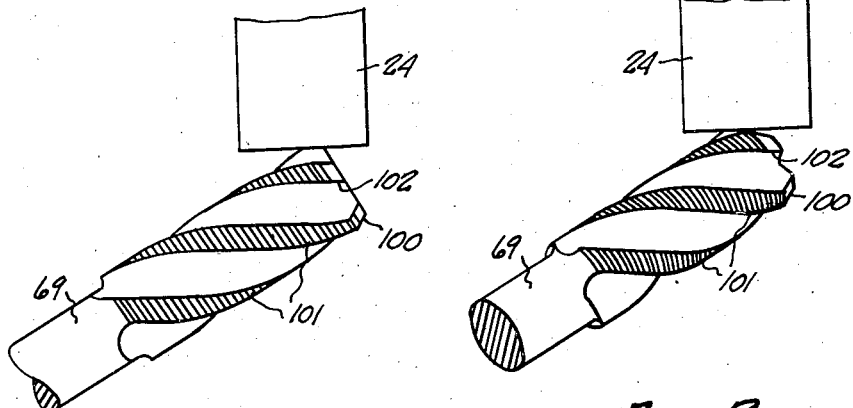
Fig. 1 is a view illustrating the conventional relation in which a tool is held against a grinding wheel by conventional work holders, as viewed along a plane tangent to the point of the wheel at which the tool engages the wheel.
Fig. 2 is a view taken on the same plane as Fig. 1 and which illustrates the proper position for a spiral type of chamfered tool relative to a grinding wheel.
Figures 3, 4:
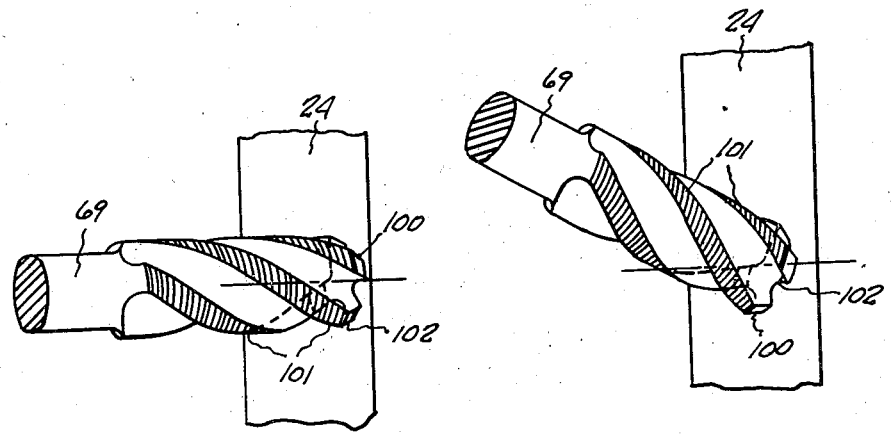
Fig. 3 is a view illustrating the conventional relation in which a tool is held against a grinding wheel as viewed along a plane radially of the wheel and coincident with the point of contact between the tool and the wheel.
Fig. 4 is a view taken on the same plane as Fig. 3 and which illustrates the proper position of a chamfered tool of the spirally fluted type relative to a grinding wheel.
Figure 5:
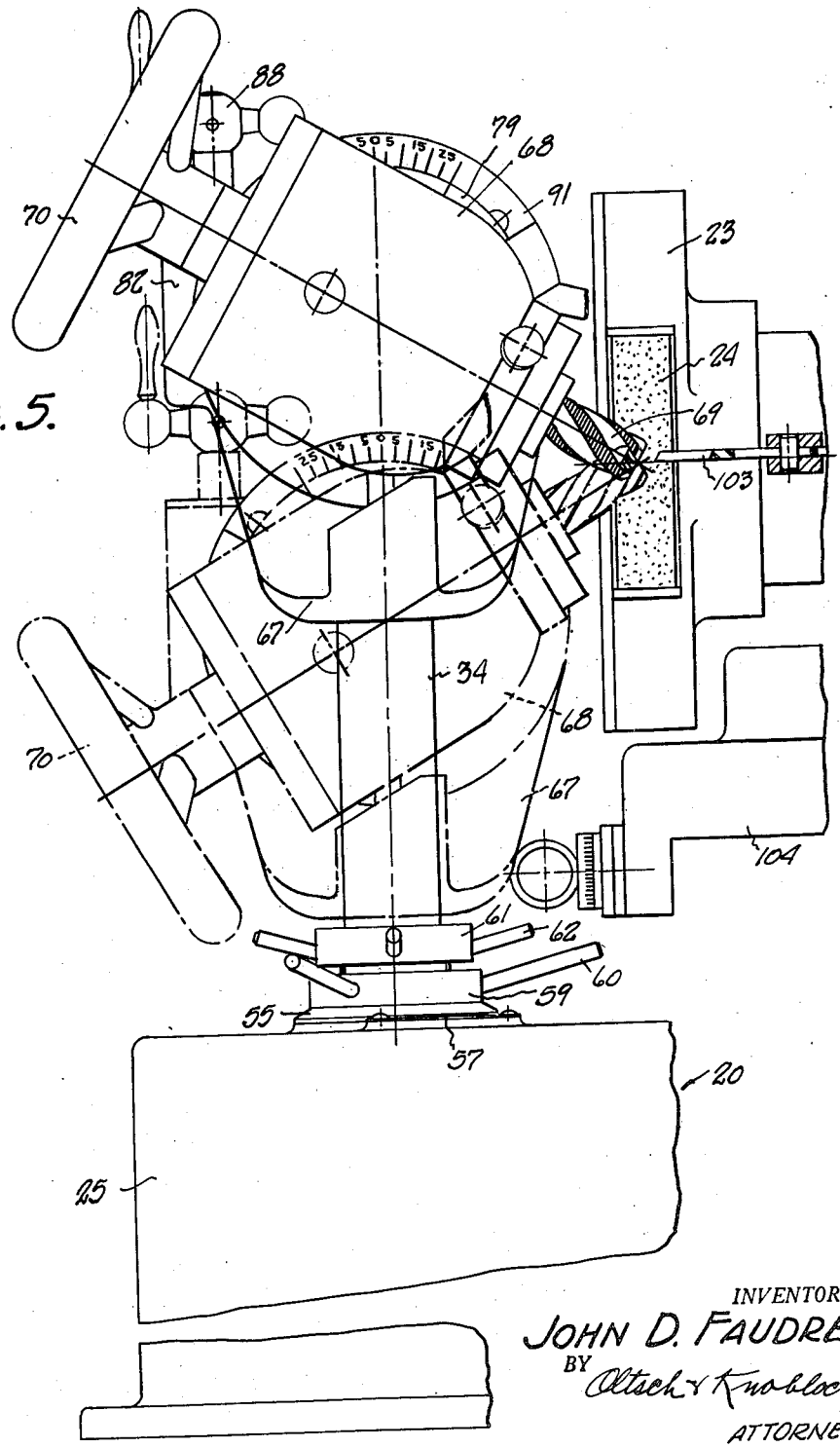
Fig. 5 is a view of the work holder in front elevation with parts of a conventional grinding machine being shown in operative relation to the work holder, wherein the work holder is shown in one position in full lines, and in the second and lower position in dotted lines.

The method of setting the work holder will be obvious from the foregoing description; however, it will be described briefly. The rotative adjustment of the tubular standard 34 and its associated parts is calculated accurately according to the angle of the chamfer 100 of the tool 69 relative to the axis of the tool. When this angle has been calculated accurately as read from the indexing mechanism illustrated in Fig. 11, that is, by setting the parts so that the mark 56 corresponds to the selected angle as read on the index 57, the member 59 is actuated to clamp the standard tube 34 and associated parts against rotation upon the frame 25. This adjustment will produce proper relation of the tool with respect to the grinding wheel 24 in the angular relation of the parts, best illustrated in Fig. 2. The lead or angle of the flutes 101 is now calculated carefully with respect to the angle of the leading edge 102 of the flute at the chamfered end portion thereof with respect to horizontal when the portion of the tool 69 at that edge 102 bears against the grinding wheel 24. When that angle has been determined, the crank mechanism 88 is actuated to tilt the chuck 68 relative to the horizontal by that same angle. This adjustment can be accurately read from the scales on the members 79 and 91, as mentioned above. It will be apparent that the angle to which the chuck 68 is tilted will vary the position of the end of the tool to be dressed relative to the axis of the grinding wheel 24 in a vertical direction. It is necessary that the tool be engaged with the grinding wheel at a portion thereof on a vertical tangent to the wheel which is customarily designated by a member 103 upon the grinding machine. For this purpose the crank 52 is operated to raise or lower the tube 34 and the chuck 68 to bring the parts into their proper relation. When these adjustments have been made of the angular tilted position of the chuck and its elevation, the tool will assume the position best illustrated in Fig. 4 when viewed horizontally from the front of the machine. The collet locking member 61 is then actuated by the handle 62 thereof to clamp the tubular members 30 and 34 against relative axial movement. With such adjustment of the device, the tool is ready to be ground. The grinder customarily has multiple cross slides including a cross slide 104, by means of which the carriage or frame for the grinding wheel may be shifted forwardly and rearwardly and operation of this cross slide makes it possible to bring the grinding wheel into contact with the tool 69. It will be understood that the chuck 68 will be of the type which permits the tool mounted therein to be rotated about its axis. Consequently, when the parts have been properly adjusted, the chamfer 100 of the tool 69 may be dressed accurately and the chamfered end of each flute 101 will be accurately and similarly dressed by the grinding wheel assuming that the latter is of accurately dressed cylindrical shape.

The tool so dressed will have all the requisite cutting properties and particularly will be characterized by uniformity as is necessary in an accurate tapping or reaming operation. With respect to a tapping operation, it may be mentioned that, if the taper or chamfer 100 is not accurate, the lead action in starting to form a tapped hole will be inaccurate and the entire work piece being tapped is spoiled. The importance of this will be realized when it is considered that tapping is usually one of the final machining operations upon a work piece, such as a carburetor or a casting for an hydraulic member or the like, so that if a part is improperly tapped and the work piece must be scrapped because of the tap, the loss is quite substantial in many instances. With the instant device it is possible to so grind the chamfered leading edge of the tap that the threads at the chamfered flute portions are ground away with full accuracy with respect to the axis of the tap and with respect to each other so that each successive partly ground thread at the chamfer follows accurately in the path of the part thread groove cut by the preceding part thread on the next adjacent and leading flute of the tap. Also, proper grinding insures that each successive part thread on the flutes at the chamfer will deepen or increase the thread groove cut in the work by an accurately predetermined amount so as to prevent unequal radial loads upon the tap in the tapping operation which would tend to spoil the thread cut by the tap. In respect to the taps it may also be mentioned that it is now well recognized that threads are classified according to the tolerance or accuracy of the thread fit. The higher the degree of accuracy required, the greater will be the need for an accurately ground tap. Likewise, in devices which require threads of greatest accuracy will customarily be found similar machining tolerances for previously machined parts, all of which directly reflects in the value of the work piece at the time when it reaches the tapping operation. Consequently, it will be apparent that in the tapping of parts requiring thread fits of the highest accuracy will occur the greatest economic loss due to spoilage of work resulting from improper conditioning of the tap.

While the embodiment of the invention herein described and illustrated is preferred, it will be understood that the invention may be embodied in other forms within the scope of the claims without departing from the spirit of the invention.

I claim:

1. The combination with a grinder having a base frame, a cross feed carriage, and a grinding wheel journaled on said carriage, of a work holder comprising an elongated upright journaled in and axially shiftable relative to said base frame and terminating in a yoke, means for axially shifting said upright, a work holding chuck pivoted to said yoke about a horizontal axis, means for locking said upright in selected rotative adjustment relative to said base frame and means for angularly adjusting said chuck relative to said upright.

2. The combination with a grinder having a base frame, a cross feed carriage, and a grinding wheel journaled on said carriage, of a work holder comprising an elongated upright journaled in and axially shiftable relative to said base frame, means for axially shifting said upright, a work holding chuck pivoted to said upright about a horizontal axis intersecting the axis of said upright, and means for angularly adjusting said chuck relative to said upright, and means for locking said upright in selected rotative position.

3. A work holder for holding a spirally fluted chamfered cutting tool on a grinder having a base and a grinding wheel, comprising a standard journaled in said base, means for locking said standard in selected rotative position, means for shifting said standard to selected vertical position, a tool holding chuck rockable on said standard about a horizontal axis intersecting the axis of said standard, and means for rocking said chuck to selected angular position.

4. A work holder for holding a spirally fluted chamfered cutting tool on a grinder having a base and a grinding wheel, comprising a standard carried by said base for adjustment vertically and rotatably, a tool holding chuck tiltably carried by said standard, and means for locking said standard in selected rotative and vertical adjustment relative to said base, and means for positioning said chuck in selected tilted adjustment on said standard, whereby said tool may be so positioned relative to said wheel that when the leading edge of the flute of said tool at the chamfer thereof engages said grinding wheel it extends parallel to the axis of said wheel.

5. A work holder for holding a spirally fluted chamfered cutting tool on a grinder having a base and a grinding wheel, comprising a standard carried by said base, a tool holding chuck carried by said standard, means for adjusting and locking said chuck tilted relative to said standard and means for locking said standard and chuck as a unit relative to said base both vertically at selected elevation and angularly about a vertical axis to position the chamfered portion of said tool against said wheel for parallel relation of the leading edges of its flutes to the axis of the wheel when the same contact said wheel, said adjusting means including means for indexing the angular position of the tool as to both axes.

6. A work holder for holding a spirally fluted chamfered cutting tool on a grinder having a base and a grinding wheel, comprising a standard shiftably carried by said base, a tool holding chuck carried by said standard, means for adjusting said chuck selectively tilted relative to said standard and means for locking said standard at selected elevation and selected angular position about a vertical axis, to position the chamfered portion of said tool against said wheel for parallel relation of the leading edges of its flutes to the axis of the wheel when the same contact said wheel, said last named means including telescoping screw threaded parts, means for rotating one part relative to the other, and means for locking the latter in selected rotative position relative to said base.

7. A work holder for positioning a work piece at a selected compound angle relative to a work-processing element of a machine having a base, comprising a collet rotatably carried by said base, a longitudinally extensible standard having a part splined to said collet means for extending said standard, said collet locking said standard in selected extending position, means for locking said collet in selected rotative position, a work holding chuck journaled on said standard about an axis transverse of said standard, and means for adjusting the angular relation of said chuck relative to said standard.

8. A work holder for positioning a work piece at a selected compound angle relative to a work-processing element of a machine having a base, comprising a collet rotatably carried by said base, a longitudinally extensible standard having a part splined to said collet and a part supported by said base spaced from said collet, means for clamping said collet on said splined standard part, means for extending said standard, means for locking said collet against rotation, a work-holding chuck rockable on said standard, and means for rocking said chuck to selected position.

9. A work holder for positioning a work piece at a selected compound angle relative to a work-processing element of a machine having a base, comprising a longitudinally extensible standard including a pair of relatively rotatable interfitting screw-threaded parts, means carried by said base at spaced points for journaling each part, one part being slidable in its journal, means for rotating the other part to extend said standard, and a work-holding chuck angularly adjustable on said slidable part.

10. A work holder for positioning a work piece at a selected compound angle relative to a work-processing element of a machine having a base, comprising a longitudinally extensible standard including a pair of relatively shiftable parts having meshing screw threads, a sleeve rotatable in said base and encircling and keyed to one of said parts, said sleeve having a longitudinally split portion projecting above said base and terminating in a tapered upper end, means for extending said standard, means bearing against the tapered end of said sleeve for clamping said sleeve to said standard, means for locking said sleeve against rotation, and a work holding chuck angularly adjustable on the upper end of said standard.

11. A work holder for positioning a work piece at a selected compound angle relative to a work-processing element of a machine having a base, comprising a sleeve rotatable in said base and having a longitudinally split portion projecting above said base, a tubular standard slidable in and keyed to said sleeve, a screw threaded shaft journaled in said base and screw threaded in said standard, manually operable gear means for rotating said shaft, means for clamping the split portion of said sleeve to said standard, and a work holding chuck angularly adjustable on said standard.

12. A work holder for positioning a work piece at a selected compound angle relative to a work-processing element of a machine having a base, comprising a sleeve rotatable in said base and having a longitudinally split portion projecting above said base, a tubular standard slidable in and keyed to said sleeve, a screw threaded shaft journaled in said base and screw threaded in said standard, manually operable gear means for rotating said shaft, means for clamping the split portion of said sleeve to said standard, and a work holding chuck angularly adjustable on said standard, and manually operable means for locking said sleeve against rotation.

13. A work holder for positioning a tool at a selected compound angle relative to a work-processing element of a machine having a base, comprising a standard, means on said base mounting said standard for rotative and longitudinal adjustment, means for locking said standard in selected longitudinal position, means for locking the standard in selected rotative position, a tool holding chuck, a chuck carrier mounted on said standard and including a part rotatable about an axis transverse of said chuck and of said standard, and means for positioning said part in selected angular adjustment.

14. A work holder for positioning a tool at a selected compound angle relative to a work-processing element of a machine having a base, comprising a standard, means on said base mounting said standard for rotative and longitudinal adjustment, means for locking said standard in selected longitudinal position, means for locking the standard in selected rotative position, a tool holding chuck, a bracket carried by said standard and having a vertical portion off-set from the axis of said standard, means mounting said chuck on said off-set portion for rotation about an axis transverse of said standard, said chuck being so positioned relative to the standard that the axis of said standard lies in the plane in which said tool moves incident to rotation of said chuck on said bracket.

JOHN D. FAUDREE.

REFERENCES CITED

The following references are of record in the file of this patent:

UNITED STATES PATENTS

| Number | Name | Date |
| --- | --- | --- |
| 2,401,874 | Kilbride | June 11, 1946 |